US008000114B2

(12) United States Patent
Bäurle et al.

(10) Patent No.: US 8,000,114 B2
(45) Date of Patent: Aug. 16, 2011

(54) METHOD AND APPARATUS FOR A CONTROL CIRCUIT WITH MULTIPLE OPERATING MODES

(75) Inventors: Stefan Bäurle, San Jose, CA (US); Giao Pham, Milpitas, CA (US)

(73) Assignee: Power Integrations, Inc., San Jose, CA (US)

( * ) Notice: Subject to any disclaimer, the term of this patent is extended or adjusted under 35 U.S.C. 154(b) by 105 days.

(21) Appl. No.: 12/412,122

(22) Filed: Mar. 26, 2009

(65) Prior Publication Data
US 2009/0185396 A1 Jul. 23, 2009

Related U.S. Application Data

(63) Continuation of application No. 11/543,543, filed on Oct. 4, 2006, now Pat. No. 7,518,885.

(51) Int. Cl.
H02M 3/335 (2006.01)

(52) U.S. Cl. .................... 363/21.13; 363/21.17

(58) Field of Classification Search ............. 363/21.13, 363/21.17, 131, 21.12
See application file for complete search history.

(56) References Cited

U.S. PATENT DOCUMENTS

| 5,014,178 | A | 5/1991 | Balakrishnan |
| 5,038,053 | A | 8/1991 | Djenguerian et al. |
| 5,045,800 | A | 9/1991 | Kung |
| 5,274,274 | A | 12/1993 | Leman et al. |
| 5,282,107 | A | 1/1994 | Balakrishnan |
| 5,285,369 | A | 2/1994 | Balakrishnan |
| 5,313,381 | A | 5/1994 | Balakrishnan |
| 5,412,557 | A | 5/1995 | Lauw |
| 5,565,762 | A * | 10/1996 | Ishikawa et al. .............. 323/222 |
| 6,107,851 | A | 8/2000 | Balakirshnan et al. |
| 6,147,883 | A | 11/2000 | Balakrishnan et al. |
| 6,154,377 | A | 11/2000 | Balakrishnan et al. |
| 6,157,182 | A | 12/2000 | Tanaka et al. |
| 6,212,079 | B1 | 4/2001 | Balakrishnan et al. |
| 6,226,190 | B1 | 5/2001 | Balakrishnan et al. |
| 6,229,366 | B1 | 5/2001 | Balakrishnan et al. |
| 6,249,876 | B1 | 6/2001 | Balakrishnan et al. |
| 6,297,623 | B1 | 10/2001 | Balakrishnan et al. |

(Continued)

FOREIGN PATENT DOCUMENTS

JP 2003-219637 7/2003

(Continued)

OTHER PUBLICATIONS

Balakrishnan, U.S. Appl. No. 60/275,962, "Method and Apparatus for Fault Condition Protection of a Switched Mode Power Supply," filed Mar. 14, 2001.

(Continued)

*Primary Examiner* — Shawn Riley
(74) *Attorney, Agent, or Firm* — Blakely Sokoloff Taylor & Zafman LLP

(57) ABSTRACT

An apparatus of regulating a power converter with multiple operating modes includes a switch coupled to an energy transfer element coupled between an input and an output of the power converter. A control circuit is also included, which is coupled to the switch to control the switch. The control circuit includes first and second duty cycle control modes to regulate power delivered to the output of the power converter. A transition between the first and second duty cycle control modes is responsive to a magnitude of a current flowing in the switch reaching a current threshold value.

11 Claims, 7 Drawing Sheets

U.S. PATENT DOCUMENTS

| | | |
|---|---|---|
| 6,304,462 B1 | 10/2001 | Balakrishnan et al. |
| 6,313,976 B1 | 11/2001 | Balakrishnan et al. |
| 6,320,768 B1 | 11/2001 | Pham et al. |
| 6,337,788 B1 | 1/2002 | Balakrishnan et al. |
| 6,351,398 B1 | 2/2002 | Balakrishnan et al. |
| 6,356,464 B1 | 3/2002 | Balakrishnan et al. |
| 6,362,981 B1 | 3/2002 | Balakrishnan et al. |
| 6,366,481 B1 | 4/2002 | Balakrishnan et al. |
| 6,388,853 B1 | 5/2002 | Balakrishnan et al. |
| 6,414,471 B1 | 7/2002 | Balakrishnan et al. |
| 6,438,003 B1 | 8/2002 | Balakrishnan et al. |
| 6,456,475 B1 | 9/2002 | Balakrishnan et al. |
| 6,462,971 B1 | 10/2002 | Balakrishnan et al. |
| 6,504,733 B1 | 1/2003 | Watson, III et al. |
| 6,515,876 B2 | 2/2003 | Koike et al. |
| 6,525,514 B1 | 2/2003 | Balakrishnan et al. |
| 6,538,908 B2 | 3/2003 | Balakrishnan et al. |
| 6,580,593 B2 | 6/2003 | Balakrishnan |
| 6,580,622 B2 | 6/2003 | Balakrishnan et al. |
| 6,608,471 B2 | 8/2003 | Balakrishnan et al. |
| 6,643,153 B2 | 11/2003 | Balakrishnan et al. |
| 6,667,605 B2 | 12/2003 | Balakrishnan et al. |
| 6,687,101 B2 | 2/2004 | Balakrishnan et al. |
| 6,714,425 B2 | 3/2004 | Yamada et al. |
| 6,744,645 B2 | 6/2004 | Balakrishnan et al. |
| 6,747,443 B2 | 6/2004 | Balakrishnan et al. |
| 6,747,444 B2 | 6/2004 | Balakrishnan et al. |
| 6,750,640 B2 | 6/2004 | Balakrishnan et al. |
| 6,781,357 B2 | 8/2004 | Balakrishnan et al. |
| 6,784,646 B2 | 8/2004 | Balakrishnan et al. |
| 6,788,514 B2 | 9/2004 | Balakrishnan |
| 6,833,692 B2 | 12/2004 | Balakrishnan et al. |
| 6,876,181 B1 | 4/2005 | Balakrishnan et al. |
| 6,882,134 B2 | 4/2005 | Balakrishnan et al. |
| 6,900,622 B2 | 5/2005 | Balakrishnan et al. |
| 6,914,793 B2 | 7/2005 | Balakrishnan et al. |
| 6,954,057 B2 | 10/2005 | Balakrishnan et al. |
| 6,967,472 B2 | 11/2005 | Balakrishnan et al. |
| 6,992,471 B2 | 1/2006 | Balakrishnan et al. |
| 7,016,204 B2 * | 3/2006 | Yang et al. ............... 363/21.13 |
| 7,034,625 B2 | 4/2006 | Pham |
| 7,038,439 B2 | 5/2006 | Balakrishnan et al. |
| 7,045,994 B2 | 5/2006 | Balakrishnan et al. |
| 7,061,301 B2 | 6/2006 | Pham |
| 7,068,022 B2 | 6/2006 | Balakrishnan |
| 7,091,752 B2 | 8/2006 | Balakrishnan |
| 7,099,128 B2 | 8/2006 | Balakrishnan et al. |
| 7,109,696 B2 | 9/2006 | Balakrishnan et al. |
| 7,110,270 B2 | 9/2006 | Balakrishnan et al. |
| 7,489,529 B2 * | 2/2009 | Yang ........................ 363/40 |
| 2004/0195976 A1 | 10/2004 | Balakrishnan et al. |
| 2004/0212942 A1 | 10/2004 | Balakrishnan |
| 2005/0073785 A1 | 4/2005 | Djenguerian et al. |
| 2005/0152164 A1 | 7/2005 | Balakrishnan et al. |
| 2005/0200395 A1 | 9/2005 | Pham |
| 2005/0258811 A1 | 11/2005 | Matsuo et al. |
| 2006/0028190 A1 | 2/2006 | Balakrishnan et al. |
| 2006/0053319 A1 | 3/2006 | Balakrishnan et al. |
| 2006/0098463 A1 | 5/2006 | Bäurle et al. |
| 2006/0139111 A1 | 6/2006 | Pham |
| 2006/0158909 A1 | 7/2006 | Hawley |
| 2006/0176039 A1 | 8/2006 | Balakrishnan |
| 2006/0176716 A1 | 8/2006 | Balakrishnan et al. |
| 2006/0181253 A1 | 8/2006 | Balakrishnan et al. |
| 2006/0192540 A1 | 8/2006 | Balakrishnan et al. |
| 2006/0238224 A1 | 10/2006 | Balakrishnan |
| 2006/0250743 A1 | 11/2006 | Balakrishnan et al. |
| 2006/0261878 A1 | 11/2006 | Pham |
| 2006/0273772 A1 | 12/2006 | Groom |
| 2006/0273773 A1 | 12/2006 | Balakrishnan et al. |
| 2007/0002510 A1 | 1/2007 | Bäurle et al. |
| 2007/0007937 A1 | 1/2007 | Park et al. |
| 2007/0007938 A1 | 1/2007 | Djenguerian et al. |
| 2007/0008749 A1 | 1/2007 | Bäurle et al. |
| 2007/0008753 A1 | 1/2007 | Kroes |
| 2007/0008756 A1 | 1/2007 | Djenguerian et al. |
| 2007/0046294 A1 | 3/2007 | Matthews et al. |
| 2007/0047268 A1 | 3/2007 | Djenguerian |
| 2007/0143636 A1 | 6/2007 | Bailey et al. |
| 2008/0024105 A1 | 1/2008 | Wang |

FOREIGN PATENT DOCUMENTS

| | | |
|---|---|---|
| JP | 2006-149067 | 6/2006 |
| WO | WO 02/27904 | 4/2002 |

OTHER PUBLICATIONS

Balakrishnan et al., U.S. Appl. No. 60/316,583, "Method and Apparatus for Trimming Current Limit and Frequency to Maintain a Constant Maximum Power," filed Aug. 31, 2001.

Balakrishnan et al., U.S. Appl. No. 60/325,642, "Method and Apparatus for Maintaining a Constant Load Current With Line Voltage in a Switch Mode Power Supply," filed Sep. 27, 2001.

Balakrishnan et al., U.S. Appl. No. 60/335,158, "Method and Apparatus for a Switch Mode Power Supply That Generates a High Pulse Width Modulation Gain While Maintaining Low Noise Sensitivity," filed Nov. 13, 2001.

Balakrishnan et al., U.S. Appl. No. 60/350,158, "Method and Apparatus for Maintaining an Approximate Constant Current Output Characteristic in a Switched Mode Power Supply," filed Jan. 17, 2002.

Koike, K. et al., "A new multi mode quasi-resonant power IC's and its new control technologies for switching mode power supply." Sanken Electric Co., Ltd. Zip code 352-8666, 3-6-3 Kitano Niiza-Shi Saitama, Japan, Tel: 81484876124, pp. 1-8.

"STR-E1500 Family Application Note," Sanken Electric Co., Ltd, http://www.sanken-ele.co.jp, pp. 1-28.

"NCP1027: High-Voltage Switcher for Medium Power Offline SMPS Featuring Low Standby Power," Semiconductor Components Industries, LLC, Rev. 2, Jun. 2006, pp. 1-30.

"NCP1201: PWM Current-Mode Controller for Universal Off-Line Supplies Featuring Low Standby Power with Fault Protection Modes," Semiconductor Components Industries, LLC, Rev. 0, Jul. 2003, pp. 1-18.

"NCP1230: Low-Standby Power High Performance PWM Controller," Semiconductor Components Industries, LLC., Rev. 1, Jun. 2004, pp. 1-22.

EP 07 25 3940—European Search Report and written opinion, dated Sep. 23, 2009, 7 pages.

First Chinese Office Action, Application No. 200710192951.3, Office Action mailed Mar. 24, 2011.

* cited by examiner

METHOD AND APPARATUS FOR A CONTROL CIRCUIT WITH MULTIPLE OPERATING MODES

REFERENCE TO RELATED APPLICATION

The present application is a continuation of U.S. patent application Ser. No. 11/543,543, filed Oct. 4, 2006, now pending, entitled "METHOD AND APPARATUS FOR A CONTROL CIRCUIT WITH MULTIPLE OPERATING MODES," which is hereby incorporated by reference.

BACKGROUND INFORMATION

1. Field of the Disclosure

The present invention relates generally to control circuits and, more specifically, the present invention relates to control circuits used in power converters that implement multiple operating modes.

2. Background

Power converter control circuits may be used for a multitude of purposes and applications. Due to increasing global requirements for energy efficient power converter solutions, there is increasing demand for control circuit functionality to meet these requirements. In addition, most power converter applications have cost goals. In the case of a control circuit forming part of an integrated circuit, the package in which the integrated circuit is housed can significantly contribute to its cost. The number of pins or terminals that it uses in turn influences the cost of the integrated circuit package. It is therefore desirable for a control circuit to implement control modes that allow energy efficiency goals to be met in a package with low pin count to meet the cost goals of the power converter application.

Energy efficient power converters typically employ a switching power converter configuration in which a switch is coupled to the control circuit and to an energy transfer element. The energy transfer element could be a transformer in power converters such as flyback or forward converters or a simple inductor in other power converter configurations such as buck, Cuk or SEPIC converters. The control circuit controls switching of the switch to regulate energy transferred through the energy transfer element and therefore power delivered to an output of the power converter.

Many power converter control solutions implement two or more control modes. Typically one control mode of operation is implemented for normal load conditions and another mode is implemented under very light load, standby or no-load conditions. A typical control mode of operation for very light load, standby or no-load conditions is referred to as cycle skipping or burst mode control. These modes of control typically maintain the regulation of an output parameter of the power converter by alternating between periods where power is delivered to the output of the power converter and periods where the power delivered to the output of the power converter to substantially zero. In this type of control mode, the period of time for which substantially zero power is delivered to an output of the power converter is regulated in order to maintain regulation of an output parameter, typically an output voltage appearing across output terminals of the power converter. These modes of control improve the efficiency and therefore reduce the energy consumption of the power converter since the periods for which substantially zero power is delivered to the power converter output are typically achieved by suspending switching of the switch coupled to the energy transfer element. Switching losses associated with the switching of the switch are therefore eliminated for the period for which switching is suspended.

This burst mode or cycling skipping mode of operation is well suited to very light load, standby or no-load conditions. However, emerging energy efficiency standards are requiring that stringent power converter efficiency goals are achieved over a wide range of load conditions. At higher load conditions the cycle skipping or burst mode control schemes described above are less effective since they tend to lead to power converter instability, increased power converter output voltage ripple and potentially audible noise.

At higher load conditions therefore pulse width modulation (PWM) control or duty cycle control schemes are better suited. For the purpose of this disclosure, these PWM or duty cycle control schemes are defined as those schemes that do not require cycle skipping to regulate power delivered to an output of the power converter. Such control schemes avoid the need to skip switching cycles by instead controlling various other parameters to regulate the power delivered to the output of the power supply. For example, voltage mode control employs a fixed switching frequency and varies an on-time of the switch during each switching period. The switching frequency being the reciprocal of one switching cycle period of the switch. The ratio of the switch on-time to the overall period of the switching cycle is referred to as the duty cycle.

Another common control scheme is current mode control that employs a fixed switching frequency and varies a current limit threshold of a current flowing in the switch while the switch is on. By regulating the current limit threshold, the energy per cycle is regulated and in turn the power delivered to the output of the power converter is regulated.

Yet another example of a PWM or duty cycle control scheme is fixed on time variable off time. Although the variable off time of this control scheme gives rise to changes in switching cycle time, it still fits the definition of a PWM or duty cycle control mode of operation given above in that the switching cycle time period is gradually changed from one switching cycle to the next to regulate the power delivered and no cycles are skipped.

Still other control schemes such as fixed off time variable on time, resonant mode and quasi-resonant mode all regulate power delivered to the output of the power converter without skipping cycles, but instead by varying the switch on-time pulse width as a proportion of a switching cycle period. Again, the switch on-time as a proportion of a switching cycle period is referred to as the duty cycle.

In each case, although the control schemes may result in changes in switching period over a number of switching cycles, they fit the definition of a duty cycle control mode of operation for this disclosure as they do not skip cycles and the switching cycle time period is changed gradually over a number of cycles to regulate the power delivered. For the purposes of this disclosure therefore, these various control schemes that regulate the power delivered through varying the switch on time as a proportion of the switching cycle time period without skipping cycles will be referred to as duty cycle control modes of operation. It is understood that an alternative description for these operating modes could be PWM modes of operation.

One key challenge in implementing multiple duty cycle control modes of operation is ensuring a smooth transition between operating modes. The transition between modes normally introduces some change or discontinuity in the control loop gain of the power converter since each duty cycle control operating mode has distinct characteristics in term of control loop gain depending on the operating conditions of the power converter. Known solutions employ hysteresis when transitioning between duty cycle control operating modes to ensure that any change in the control loop gain during the transition from one control mode to another control mode, does not result in control loop instability potentially causing oscillations between modes, which could give rise to power converter output voltage ripple, audible noise and even damage to certain components within the power converter.

Another key challenge in implementing multiple duty cycle control modes of operation is to maintain a low cost solution. The control circuit should require the minimum number of terminals to implement the multiple operating modes. Known solutions implementing multiple duty cycle control operating modes employ additional terminals to sense the load condition at which to transition from one duty cycle control mode to another. Such terminals are coupled to an additional winding on the energy transfer element of the power converter to detect the period of energy delivery during each switching cycle which changes with output load. Such implementations perform a bottom detect (BD) scheme to sense when a voltage on the additional energy transfer element winding rings to a low voltage level, which is an indication that energy delivery to the power converter output is complete for that switching cycle.

It is therefore desirable to have a control circuit that maintains high power converter efficiency across a very wide load range by implementing multiple duty cycle control modes, while employing low cost packaging to maintain a low cost power converter design.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for implementing a control circuit having multiple operating modes are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or subcombinations in one or more embodiments. In addition, it is appreciated that the figures provided herewith are for explanation purposes to persons ordinarily skilled in the art and that the drawings are not necessarily drawn to scale.

A control circuit with multiple operating modes in accordance with the teachings of the present invention will now be described. Examples of the present invention involve methods and apparatuses to generate control circuits with multiple operating modes.

Figure 1:
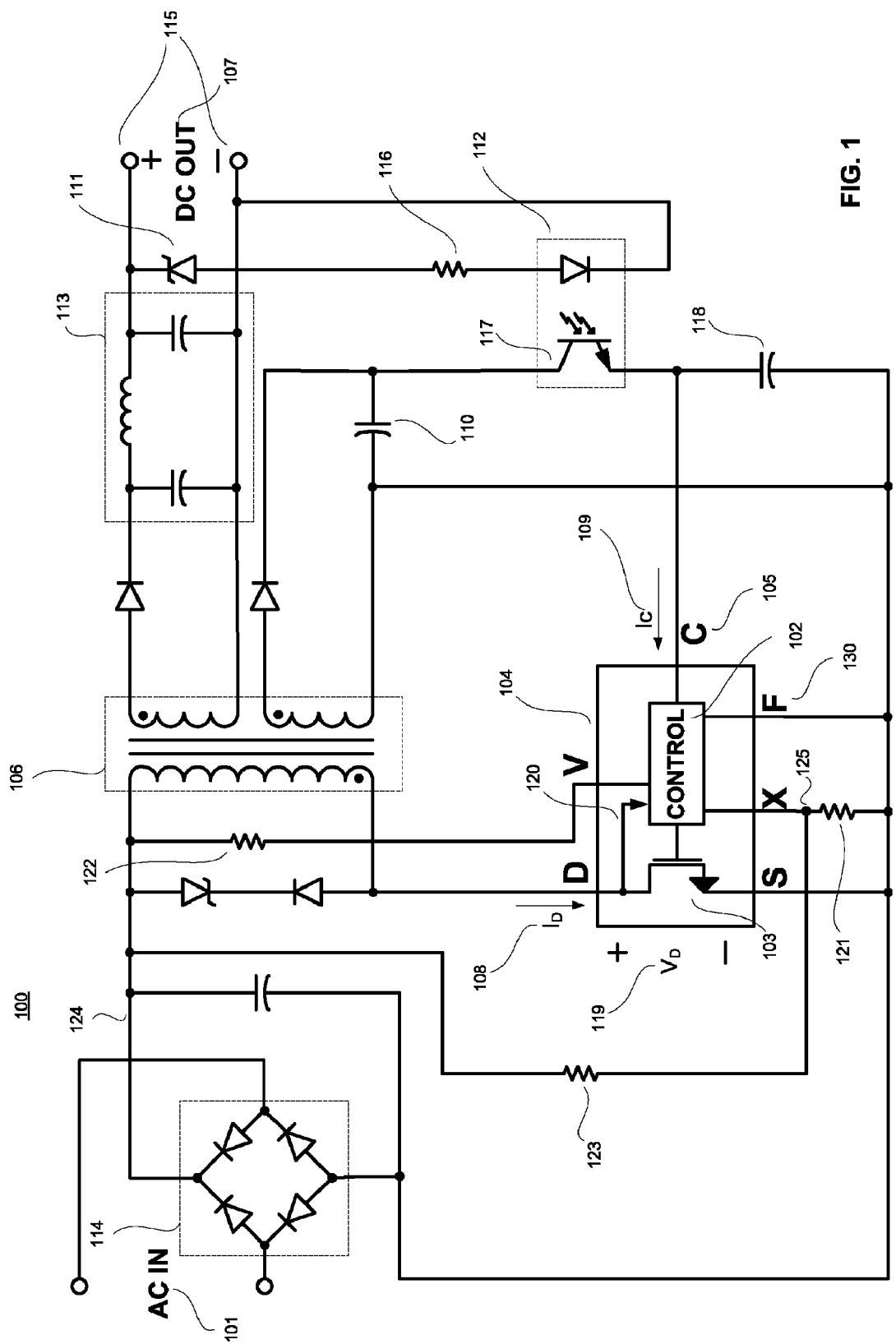
FIG. 1 is a schematic illustrating generally an example power converter employing a control circuit with multiple operating modes in accordance with the teachings of the present invention.

FIG. 1 shows generally a schematic of a power converter 100 employing a control circuit with multiple duty cycle control operating modes in accordance with the teachings of the present invention. In one example, power converter 100 is a flyback converter. It is noted that in other examples, power converter 100 could also be one of many power converter configurations such as a forward converter or buck converter and could be an isolated or non-isolated converter in accordance with the teachings of the present invention.

As shown, a control circuit 102 is coupled to a switch 103, which in one example is a MOSFET semiconductor switch. Switch 103 is coupled to energy transfer element 106, which is coupled to an AC input voltage 101 through rectifier bridge 114. In one example, control circuit 102 and switch 103 form part of an integrated circuit 104 that could be manufactured as a hybrid or monolithic integrated circuit. Control circuit 102 is coupled to receive a feedback signal 109, which in one example is a current signal but could also be a voltage signal whilst still benefiting from the teachings of the present invention.

In the example, control circuit 102 is coupled to regulate power delivered to the power converter output terminals 115 of power converter 100. In one example, the specific output parameter being regulated is the DC output voltage 107, but in a different configuration could also be an output current flowing in output terminals 115. In the example, the feedback signal 109 is generated in response to output voltage 107 across feedback components 111, 116 and 112. In one example control circuit 102 uses feedback terminal 105 also to provide operating power to the control circuit 102. Capacitor 118 provides a low impedance source for storing energy used to supply control circuit 102. However, in other examples, control circuits that separate feedback and supply terminals could also be used in accordance with the teachings of the present invention.

In the example, control circuit 102 is included as part of a control loop, which also includes switch 103, energy transfer element 106, output filter 113, Zener diode 111, resistor 116, opto-coupler 112 and capacitor 118. In the example, the control loop including the components listed above has a gain characteristic that governs the power delivery to power converter output terminals 115 in response to feedback signal 109. While all of the components in the control loop contribute to the control loop gain, the stability of the control loop under all conditions is dependent on the response of controller 102 to feedback signal 109.

In one example, an oscillator internal to controller 102, which will be discussed in more detail with respect to FIG. 6 below, determines a switching cycle period of switch 103 when the controller is operating in a duty cycle control mode. In the example, control circuit 102 is also coupled to receive a signal 120 responsive to the current 108 flowing in switch 103. In the example of FIG. 1, the signal 120 represents the voltage 119 appearing across switch 103, though in other examples a resistor coupled to conduct the current 108 in switch 103 could be used to generate this signal.

As shown, control circuit 102 is also coupled to a resistor 121, which in one example sets a current limit threshold level. If the current 108 flowing in switch 103 exceeds this threshold level, switch 103 is turned off by control circuit 102. In one example, an optional resistor 123 is coupled between node 125 and a DC rail 124. This resistor introduces a signal at node 125 that varies as the AC input voltage 101 varies, which in adjusts the current limit threshold level described above. This feature is useful in applications of power converters that are required to operate across very wide input voltage ranges since varying the current limit threshold level helps to maintain a constant maximum power converter output power capability independent of input voltage.

Figure 2:
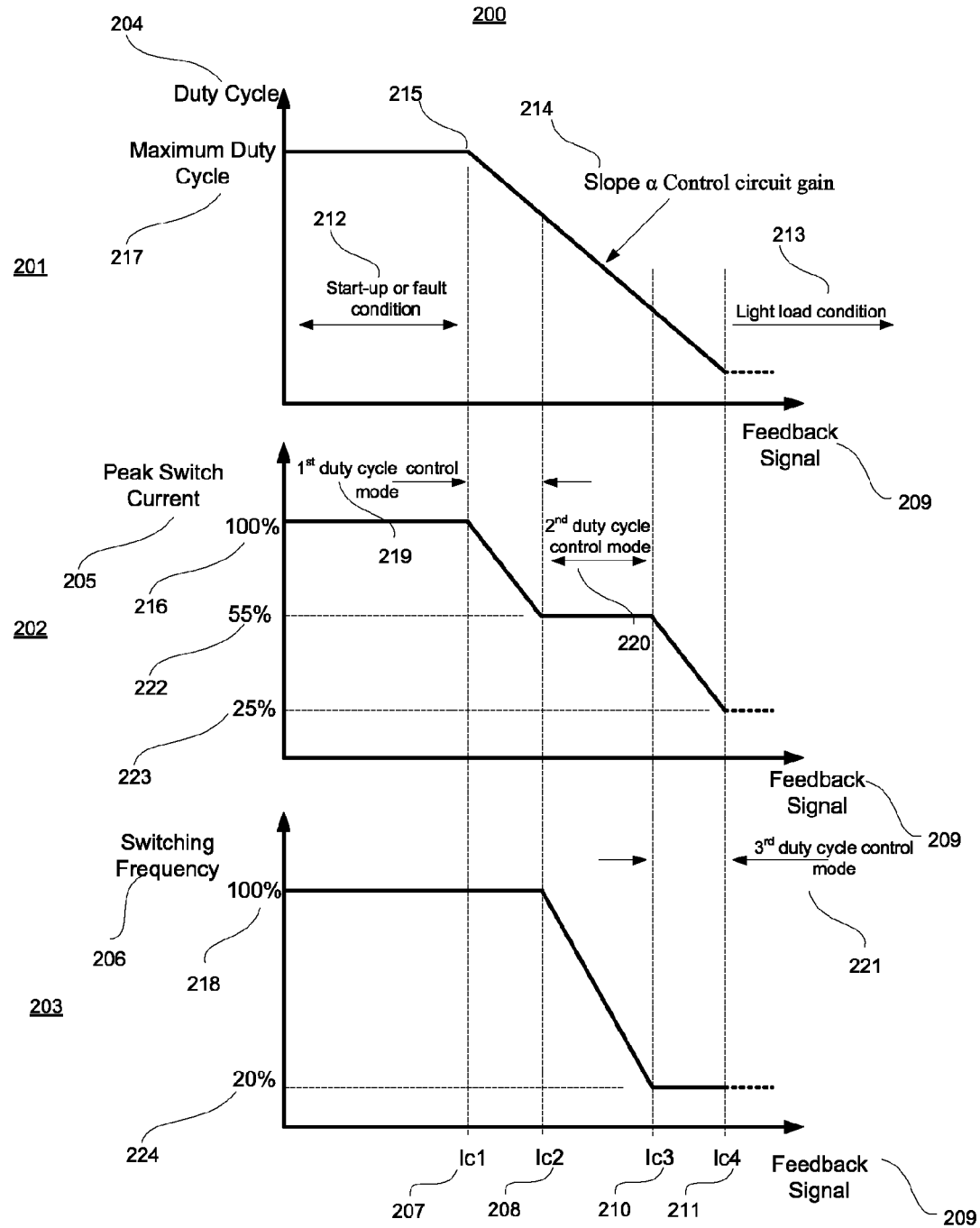
FIG. 2 shows generally control waveforms for an example control circuit with multiple operating modes in accordance with the teachings of the present invention.

FIG. 2 shows generally control characteristics 200 for one example of a control circuit 102 in response to feedback signal 109. Characteristic 201 shows the response of the control circuit duty cycle 204 to feedback signal 209. For the purposes of this description, the feedback signal 209 will be regarded as a current signal. In region 212, the controller 102 is unresponsive to feedback signal 209. In power converter 100, this operating region could relate to a start-up or fault condition where the power converter is not regulating the power delivered to the output of the power converter, but instead, in the example, is operating at maximum duty cycle 217, 100% peak switch current 216 and 100% oscillator frequency 218. In another example, in region 212, the power converter could be operating at maximum duty cycle 217 or 100% peak switch current 216 and 100% oscillator frequency 218.

At feedback signal value Ic1 207, however, the duty cycle 201 starts to be regulated and in one example, the peak switch current 202 also reduces. In other examples, influenced by the power converter design and input voltage, the peak switch current may start to be regulated at a different value of the feedback signal 209. However, for explanation purposes in this description, both duty cycle and peak switch current are assumed to reduce at feedback signals greater than Ic1 207.

At feedback signal value Ic1 207, the controller enters a first duty cycle control mode 219. In one example, this is a voltage control mode in which the switch 103 on-time is regulated with a fixed switching frequency, which for the purposes of this description is also an oscillator frequency of an oscillator within control circuit 102, as indicated with characteristic 203. In one example the oscillator may employ a frequency jitter in the first duty cycle control mode 219 region in which the switching frequency is modulated around the average 100% 218 value. In the illustrated example, this technique of frequency jittering is one that reduces the generation of electromagnetic interference (EMI) by power converter 100.

As shown in FIG. 2, the magnitude of the peak switch current 205 reaches a threshold value when the feedback signal 209 reaches value Ic2 208. In one example, the peak switch current threshold value is 55% 222 of the 100% 216 value. In other examples this threshold value 222 could be any percentage of the 100% 216 value. In other examples, the value 222 as a percentage of the 100% 216 value could be variable in response to an operating condition of the power converter 100. For example, a current flowing in resistor 122 in FIG. 1 will vary according to the value of the AC input voltage 101. This signal could be used by controller 102 to vary the value 222 as a percentage of the 100% 216 according to the value of AC input voltage 101. The threshold value 222 would therefore be responsive to a magnitude of the AC input voltage 101 in accordance with the teachings of the present invention. In another example, a voltage at F terminal 130 in FIG. 1 determines the 100% switching frequency 218 of controller 102. The voltage at F terminal 130 could be used by controller 102 to vary the value 222 as a percentage of the 100% 216 according to the 100% switching frequency 218. The threshold value 222 would therefore be responsive to a switching frequency of control circuit 102 in first duty cycle control mode 219 in accordance with the teachings of the present invention.

As shown in the illustrated example, at feedback signal value Ic2 208, the control circuit 102 transitions between the first duty cycle control mode 219 to a second duty cycle control mode 220. In one example, second duty cycle control mode 220 is a fixed current limit, variable switching cycle time mode of control in which control circuit 102 regulates the peak switch current to a fixed value while modulating the switching frequency 206 below the 100% value 218 as the feedback signal 209 increases to regulate power delivered to the power converter 100 output 115. In one example, the switching frequency 206 is varied by varying an off time of the switch 103. The control circuit 102 therefore implements first and second duty cycle control modes to regulate the power delivered to the power converter 100 output 115 in accordance with the teachings of the present.

As shown in the illustrated example, the switching frequency 206 reaches a threshold value when the feedback signal 209 reaches value Ic3 210. In one example, the switching frequency threshold value 224 is 20% of the 100% 218 value. At a feedback signal 209 value of Ic3 210 therefore, the control circuit 102 transitions between the second duty cycle control mode 220 into a third duty cycle control mode 221 in accordance with the teachings of the present invention. In one example, third duty cycle control mode 221 is a voltage control mode, but could be any of the duty cycle control modes discussed above, in which control circuit 102 regulates the switch 103 on-time as a proportion of the overall switching cycle time period.

In one example, the 20% frequency threshold 224 is just above the audible frequency range for example 20 kHz to 30 kHz. At this point, the switching frequency 206 is no longer reduced to reduce the risk of generating significant audible noise. Instead, the peak current 205 is reduced, which reduces the peak flux density in the energy transfer element. When the peak flux density has been reduced in this way, for example, to a peak current of 25% 223, the power converter can then operate within the audible frequency range using a burst or cycle skipping mode, in the subsequent light load condition 213 without generating significant audible noise. The control circuit 102 has therefore implemented first, second and third duty cycle control modes to regulate the power delivered to the power converter 100 output 115 in accordance with the teachings of the present invention.

In one example, when feedback signal 209 reaches a value Ic4 211, the control circuit 102 may again transition into a further mode of operation. This is likely to be a very light load condition 213 since both switching frequency and peak switch current are greatly reduced from the 100% values. Therefore the mode of operation at feedback signals greater than Ic4 211 could be a burst mode or cycle skipping mode instead of a duty cycle control mode of control.

The slope of the peak switch current 205 reduction in first 219 and third 221 duty cycle control regions does not necessarily have to be linear as shown in the example illustrated in FIG. 2. If, for example, the current flowing in the switch 103 transitions from continuous to discontinuous mode during the first duty cycle control mode 219, the slope will change since the relationship between peak switch current 205 and switch duty cycle 204 changes between continuous and discontinuous modes of operation. In addition, the slope of the peak switch current 205 reduction in first 219 and third 221 duty cycle control regions will vary depending on the input voltage 101 value to power converter 100.

Figure 3:
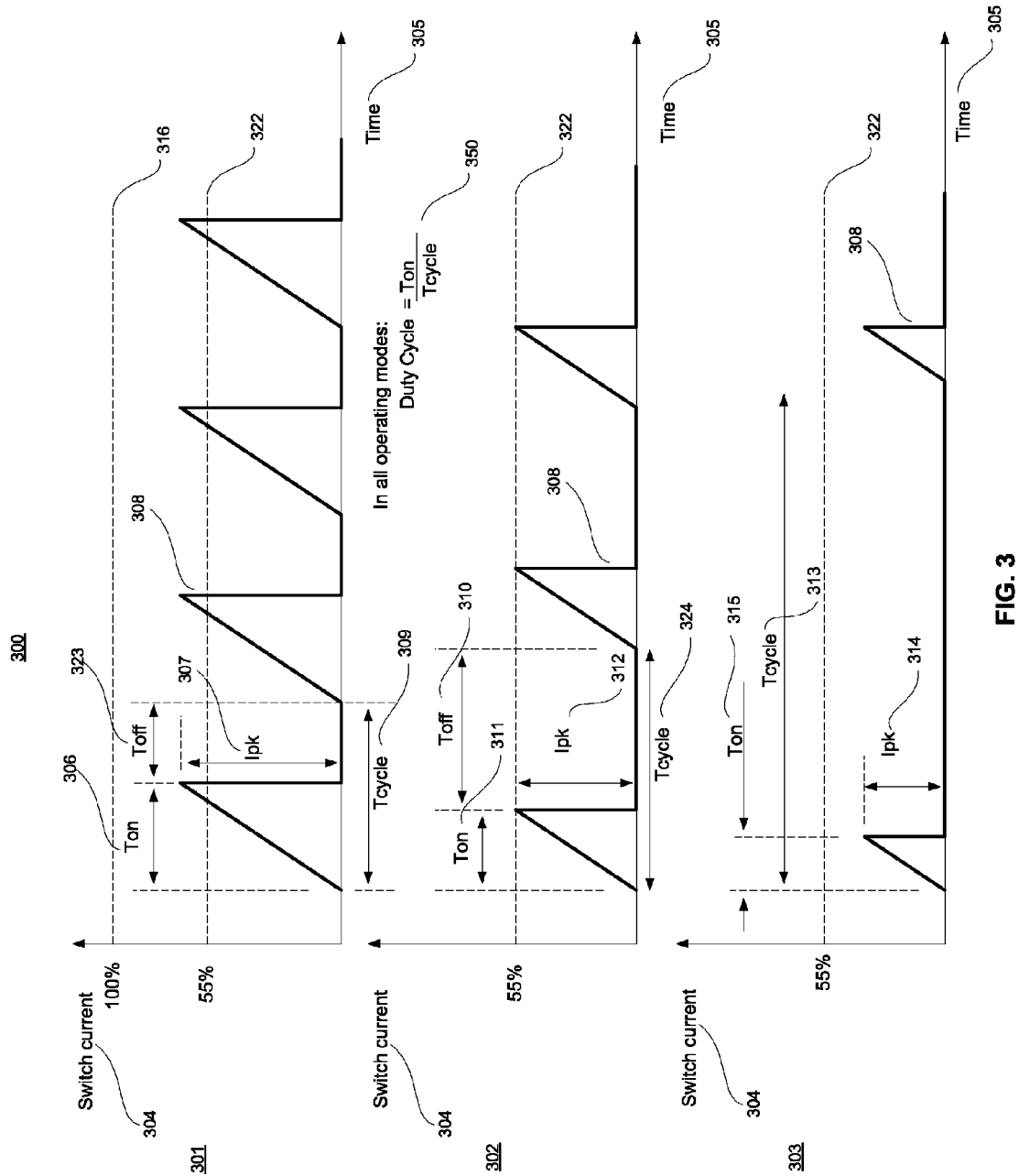
FIG. 3 shows generally current waveforms for different operating modes for an example control circuit with multiple operating modes in accordance with the teachings of the present invention.

FIG. 3 shows generally current waveforms for different operating modes for an example control circuit with multiple operating modes in accordance with the teachings of the present invention. For instance, FIG. 3 shows switch 103 current 108 as waveform 308 to illustrate the above description further. It is noted that the current waveforms shown are discontinuous for explanation purposes. In other examples, it is noted that continuous current waveforms or a mixture of continuous and discontinuous current waveforms at different load or line conditions could have been shown to explain the teachings of the present invention.

The waveform shown in 301 shows one example of switch 103 current waveforms in the first duty cycle control mode 219. In this mode, the peak current value 307 varies while in one example the cycle time Tcycle 309 remains fixed. The peak current 307 varies either by control of the on time Ton 306 as in a voltage mode control as described in FIG. 2. In another example, the peak current 307 could also be directly varied by modulating Ipk 307, the peak switch current 108 in response to the feedback signal 109, as would be the case in current mode control. In another example, both Ipk 307 and Tcycle 309 could be varied to regulate a power delivered to the output of the power converter, as would be the case in a quasi resonant or resonant mode converter. In yet another example, Ton 306 could be varied while Toff 323 is fixed.

Regardless of the control scheme used for the first duty cycle control mode 219, the transition to the second duty cycle control mode 220 will be made when the peak switch current 307 reaches a threshold value 322. The peak switch current is a measure of the output load on the power converter output and is detected by control circuit 102 without the need for additional terminals such as bottom detect (BD) terminals and therefore reduces the cost of control circuit 102.

When the peak switch current 307 reaches the threshold value 322 therefore, the control circuit 102 operation then transitions to second duty cycle control mode 220, which is illustrated by the waveform 302. In the second duty cycle mode of control region 220, Ipk 312 is regulated to a fixed value 322 while the Tcycle 324 time is varied to regulate the power delivered to the output of the power converter 100. In one example, Tcycle time 324 is varied by modulating the off-time Toff 310.

When Tcycle 324 reaches a threshold value of Tcycle 313, the control circuit 102 transitions to a third duty cycle control mode as shown in waveform 303. In common with the description of waveform 301 above, in the third duty cycle control mode of operation Ipk 314 and Ton 315 vary. However, as described with reference to waveform 301 above, the mode of control employed could also be any one of voltage mode, current mode, quasi-resonant, resonant or variable on time fixed off time in accordance with the teachings of the present invention.

Regardless of the control schemes applied in the first duty cycle control mode 219, second duty cycle control mode 220 and third duty cycle control mode 221, the stability of the control loop discussed with reference to FIG. 1 is important. This is particularly the case since the transitions take place at higher load conditions than has typically been the case in the past with known burst and cycle skipping modes, which are applied at light load conditions. This means that these transitions will occur during normal power converter operation rather than just under a standby or no-load conditions.

Thus, regardless of the control schemes used, the gain of the control circuit 102 can be characterized with reference to the duty cycle transfer characteristic 201 in FIG. 2. This characteristic relates the switch on-time 306, 311 and 315 to the switching cycle period 309, 324 and 313 in FIG. 3. As indicated in FIG. 2, by label 214, the control circuit 102 gain is proportional to the magnitude of the slope of the curve 201 in the linear region between Ic1 207 and Ic4 211.

Therefore, operating with multiple duty cycle control modes relies on the ability to maintain the slope of curve 201 in particular when the operation transitions between first 219 and second 220 duty cycle control modes and between second 220 and third 221 duty cycle control modes of operation. If this is achieved, the overall control loop gain of power converter 100 will be substantially unaffected as the control circuit 102 transitions from first 219 to second 220 and second 220 to third 221 duty cycle control modes in accordance with the teachings of the present invention. In addition, if the slope of curve 201 is maintained in this way, there is no need to introduce hysteresis between operating modes in accordance with the teachings of the present invention, and which has been necessary in the past in known power converters due to potential changes in loop gain when changing operating modes.

Figure 4:
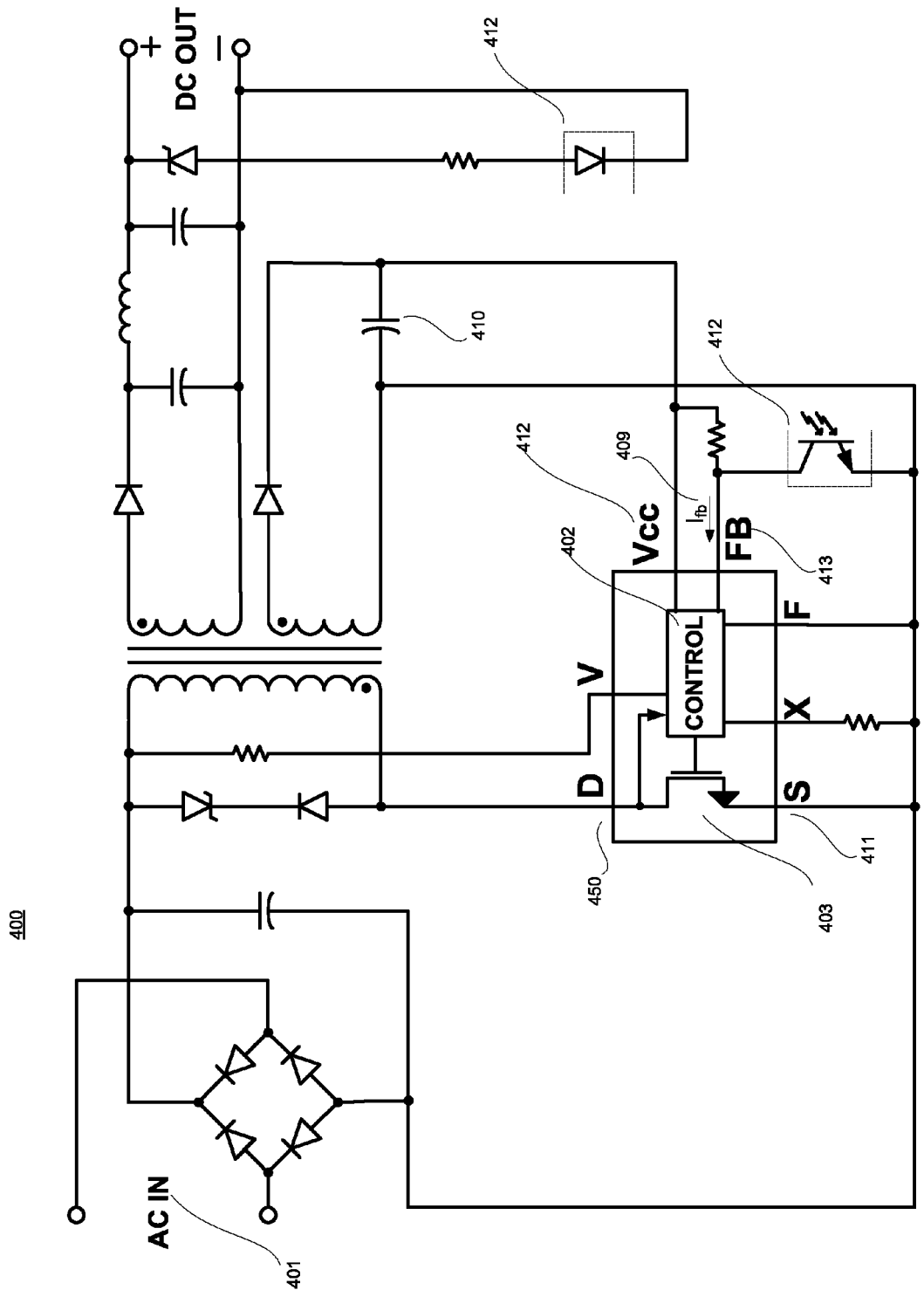
FIG. 4 is a schematic illustrating generally another example power converter employing a control circuit with multiple operating modes in accordance with the teachings of the present invention.

FIG. 4 is a schematic illustrating generally another example power converter employing a control circuit with multiple operating modes in accordance with the teachings of the present invention. It is appreciated that consideration of example power converter 400 as shown in FIG. 4 greatly simplifies a mathematical illustration of the above discussion. As can be seen, the example power converter 400 illustrated in FIG. 4 shares many aspects with the power converter 100 in FIG. 1. However the optocoupler 412 is coupled between a feedback pin FB 413 and source potential 411. Thus, controller 402 has a separate Vcc supply terminal 412 supplied directly from bias capacitor 410.

In the illustrated example, due to the connection of the optocoupler 412, the response of control circuit 402 to an increase in feedback current Ifb 409 is to increase the duty cycle of switch 403. In contrast to the example configuration shown in FIG. 1, where the duty cycle linearly decreases as the feedback signal increases in the region between Ic1 207 and Ic4 211, in the example configuration of FIG. 4 in the same operating region, the duty cycle linearly increases as the feedback signal increases.

Figure 5:
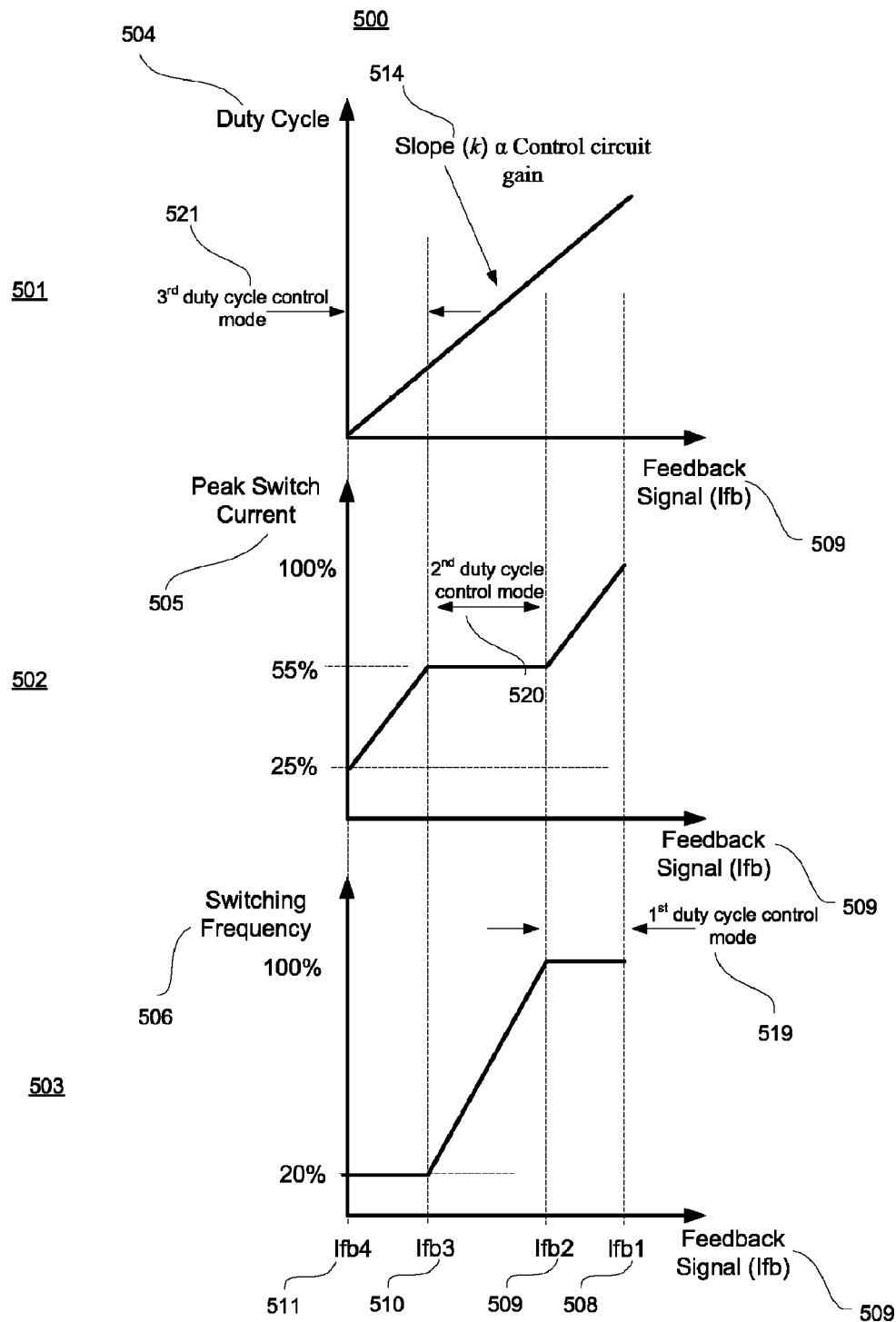
FIG. 5 shows generally control waveforms for another example control circuit with multiple operating modes in accordance with the teachings of the present invention.

This is illustrated in FIG. 5, where the characteristics illustrated in FIG. 2 are redrawn to show the linear region of curve 201 with the opposite slope for feedback signal versus duty cycle such that duty cycle increases with increasing feedback signal 509 or that the duty cycle is proportional to the feedback signal. Although characteristic 501 is shown as linearly increasing as the feedback signal increases it is only necessary for the slope 514 of the characteristic to be substantially constant during the transitions between first 519 and second 520 and second 520 and third 521 duty cycle or PWM control modes to ensure the control loop gain is constant during the transition between duty cycle or PWM control modes.

Characteristic 501 can mathematically be described as:

$$DutyCycle = k \times Ifb \quad (1)$$

Where k is the slope of characteristic 501. Referring to the waveforms of FIG. 3 and relationship 350:

$$DutyCycle = \frac{Ton}{Tcycle} \quad (2)$$

Combining equations 1 and 2 gives:

$$k \times Ifb = \frac{Ton}{Tcycle} \quad (3)$$

In one example, during first duty cycle or PWM control mode 519, the switching frequency 506 and therefore the switching cycle time period (Tcycle) is fixed. Rearranging equation 3 therefore gives:

$$Ton = k_2 \times Ifb \quad (4)$$

where $k_2 = k \times Tcycle$.

In one example, during second duty cycle control mode 520, the peak switch current is constant. Tcycle is then a function Ton and Ifb. Rearranging equation 3 gives:

$$Tcycle = \frac{Ton}{k \times Ifb} \quad (5)$$

In the second duty cycle control mode therefore, the switching cycle time period (Tcycle) is proportional to the ratio of the switch on time (Ton) and feedback current (Ifb). Since equations 4 and 5 are both derived from equation 3, the slope and therefore power converter gain of characteristic 501 is constant during the transition from first 519 to second 520 duty cycle control modes.

In one example, during third duty cycle control mode 521, the switching frequency 506, and therefore the switching cycle period (Tcycle), is again fixed. During the transition from second 520 to third 521 duty cycle control modes, therefore, the operation of controller 402 reverts to varying the switch 403 on time and thus equation 4 again applies although in one example the value of Tcycle is different to that during the first duty cycle control mode. Thus, the slope, and therefore, power converter gain of characteristic 501, is constant during the transition from second 520 to third 521 duty cycle control modes.

According to the relationship of equation 4 in the first duty cycle operating mode, the switch on time Ton is directly proportional to the magnitude of the feedback signal Ifb. In addition, in the second duty cycle operating mode described by the relationship in equation 5, the switching cycle time period is proportional to the ratio of the switch on time and the feedback signal. Furthermore, in one example, in the third duty cycle control operating mode the relationship of equation 4 again applies, and therefore the switch on time Ton, is directly proportional to the magnitude of the feedback signal Ifb. The explanation below describes one example of a detailed circuit implementation that could be used in a control circuit to provide the functionality discussed above.

Figure 6A:
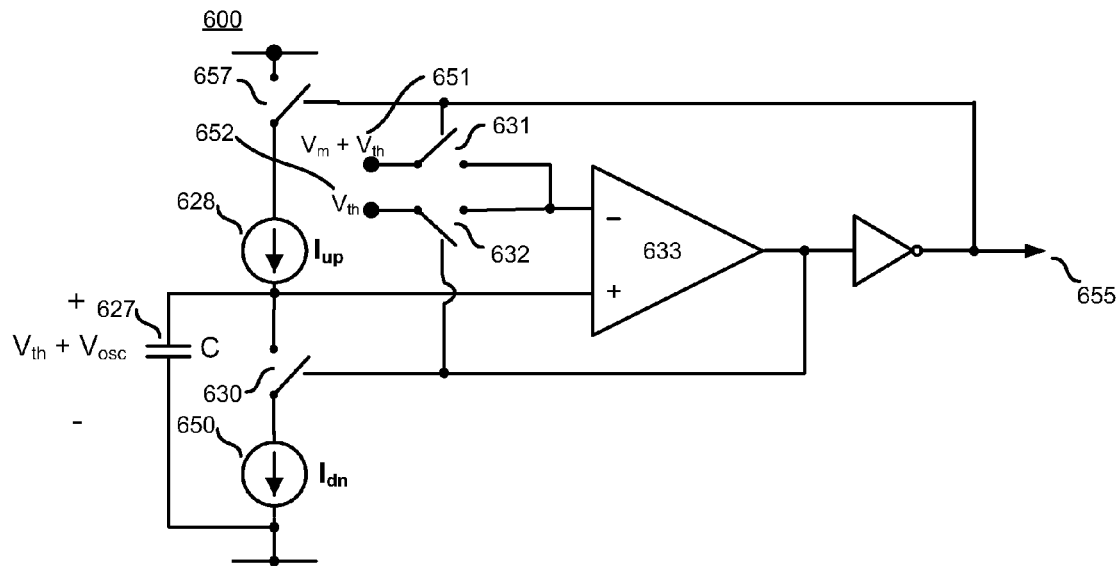
FIG. 6A is a schematic illustrating generally an example oscillator circuit for an example control circuit with multiple operating modes in accordance with the teachings of the present invention.
Figure 6B:
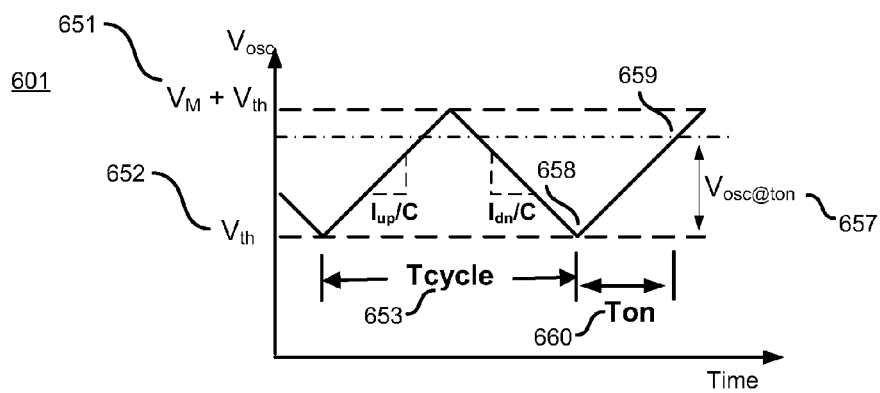
FIG. 6B shows generally an example waveform for an example control circuit with multiple operating modes in accordance with the teachings of the present invention.

In particular, FIG. 6A shows one example of an oscillator circuit 600 that will provide a fixed or variable Tcycle time according to the requirements for the operating modes discussed above. FIG. 6B illustrates an example waveform 601, which shows generally the oscillator voltage Vth+Vosc appearing across capacitor 627. In the example, capacitor 627 is alternately charged and discharged between voltage levels 651 and 652 to provide a Tcycle time 653. In one example, Tcycle is varied by varying the value of the $I_{dn}$ discharge current 650 while Iup 628 remains fixed. Switches 657 and 630 are alternately switched when the voltage on capacitor C 627 reaches the two oscillator threshold levels Vth 652 Vm+Vth 651, which are in turn connected and disconnected from comparator 633 using switches 631 and 632.

In one example the output signal 655 is coupled to a switch such as switch 403 in FIG. 4 and determines the time at which the switch 403 is turned on at the beginning of each switching cycle. Other logic circuitry will determine the time at which the switch is turned off each switching cycle as will discussed with reference to FIG. 7 below. The example waveform 601 in FIG. 6 shows the oscillator voltage Vth+Vosc appearing across capacitor 627. For explanation purposes in the following mathematical explanation, it is helpful to identify a voltage level Vosc@ton 657, which is the voltage across capacitor 627 in excess of Vth, at the end of the on time of the switch 403. The switch 403 on time starts at time 658 and the switch 403 turn off occurs at time 659. The switch 403 on time during each oscillator cycle is therefore Ton 660.

By identifying the time and the oscillator voltage, Vosc@ton 657 at the end of the switch on time, it is now possible to express Ton and Tcycle in terms of the oscillator parameters of oscillator 600.

$$Ton = \frac{C}{Iup} \times Vosc@ton \quad (6)$$

$$Tcycle = Vm \times C \times \left(\frac{1}{Iup} + \frac{1}{Idn}\right) \quad (7)$$

With the relationships of equations 6 and 7 identified, substitution for Ton and Tcycle in equation 3 will provide the relationship necessary to maintain the control loop gain substantially constant regardless of the operating mode of the control circuit, in terms of the oscillator circuit parameters:

$$k \times Ifb = \frac{\frac{C}{Iup} \times Vosc@ton}{Vm \times C \times \left(\frac{1}{Iup} + \frac{1}{Idn}\right)} \quad (8)$$

The following manipulation of equation 8 is in order to make $I_{dn}$ the subject since, in accordance with the description above, it is this parameter that will be varied to provide control.

In one example of the circuit implementation, constant k is a fixed current source such that:

$$k = \frac{1}{Io} \quad (9)$$

Rearranging 8 and substituting for k gives:

$$Ifb \times Vm \times \frac{1}{Iup} + Ifb \times Vm \times \frac{1}{Idn} = \frac{Io}{Iup} \times Vosc@ton \qquad (10)$$

Rearranging 10 to eliminate the denominators gives:

$$(Ifb \times Vm \times Idn) + (Ifb \times Vm \times Iup) = Io \times Idn \times Vosc@\text{ton} \qquad (11)$$

Further rearranging 11 to make $I_{dn}$ the subject gives:

$$Idn = \frac{ifb \times Iup}{Io \times \frac{Vosc@ton}{Vm} - Ifb} \qquad (12)$$

A circuit that sets a value of $I_{dn}$ according to equation 12, based on the oscillator voltage at the switch on time, Vosc@ton, will therefore maintain the control loop gain substantially constant regardless of the operating mode of the control circuit in accordance with the teachings of the present invention.

It is appreciated that there are many ways to vary Tcycle other than varying the value of the $I_{dn}$ discharge current 650 while Iup 628 remains fixed. For example the oscillator cycle time Tosc could be varied by maintaining Iup 628 and Idn 650 constant but introducing a variable delay time before closing either switch 657 or switch 630. By making the variable delay time a function of voltage level Vosc@ton 657, Tcycle can be varied in accordance with the relationship of Equation 3 and thus maintaining the control loop gain substantially constant regardless of the operating mode of the control circuit in accordance with the teachings of the present invention.

Figure 7:
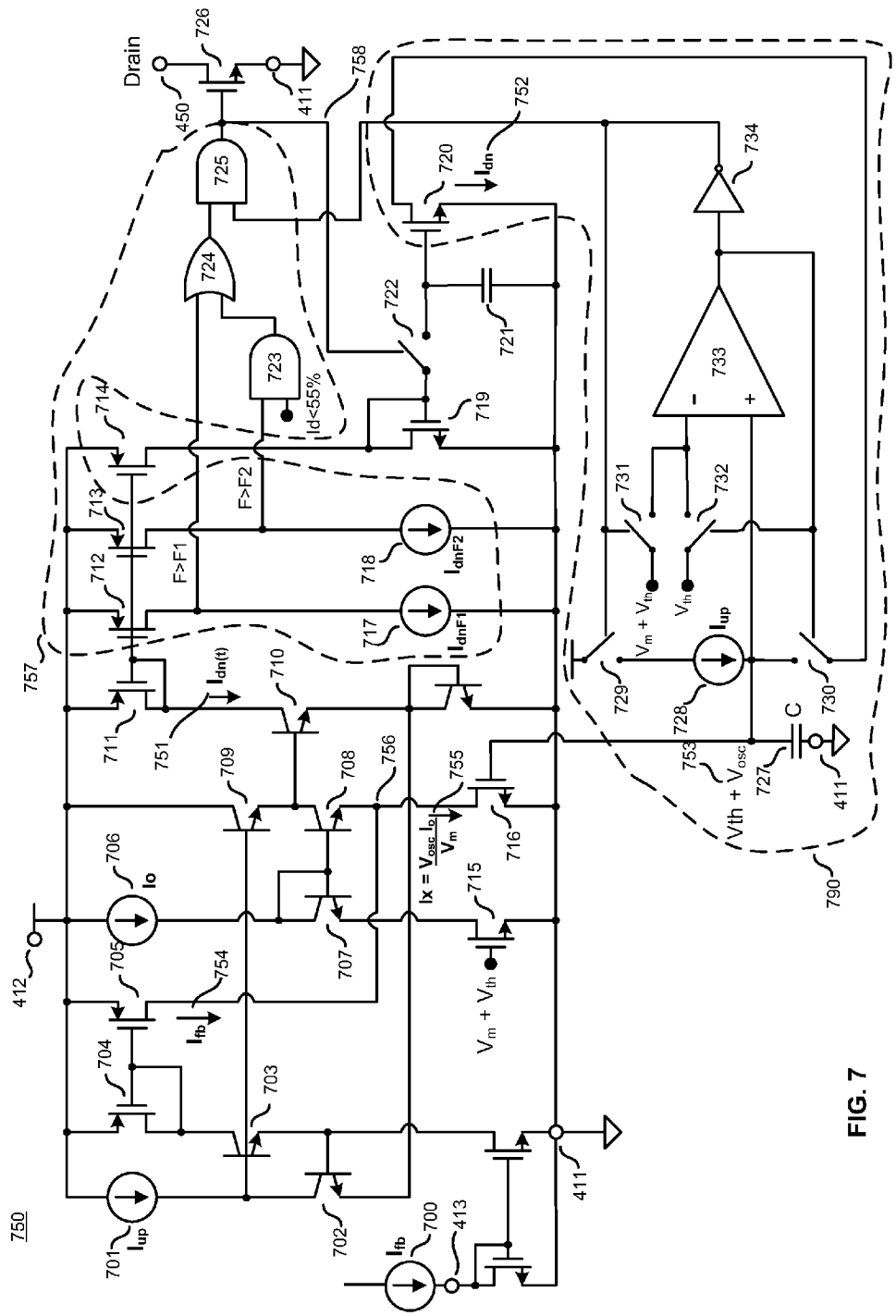
FIG. 7 is a schematic illustrating generally a portion of an control circuit implementing multiple operating modes in accordance with the teachings of the present invention.

The schematic of FIG. 7 shows generally one example of a portion of a control circuit that realizes the relationship of equation 12 in accordance with the teachings of the present invention. As shown in the example, circuit 750 has terminals 411, 412, 413 and 450, which in one example are correspond with the respective nodes of the circuit shown in FIG. 4. In one example, feedback signal Ifb 700 is equivalent to feedback signal 409 in FIG. 4. In another example feedback signal Ifb 700 could be an internal signal generated from an inversion of feedback current Ic 109 in FIG. 1. In the example, transistor switch 726 is equivalent to the switches 103 and 403 in FIGS. 1 and 4, respectively. Oscillator 790 is equivalent to oscillator 600 in FIG. 6A, where transistor 720 is corresponds to the $I_{dn}$ current source 650 in FIG. 6A.

In the example, the overall function of circuit 750 is generally to capture the oscillator voltage, Vosc 753 at the end of the switch 726 on time and then uses this Vosc@ton voltage to set the necessary $I_{dn}$ 752 current in accordance with the relationship in equation 12 in accordance with the teachings of the present.

As shown in the example, circuit 750 includes a multiplier circuit formed by transistors 702, 703, 709 and 710. The operation of this multiplier circuit is such that the product of the currents flowing in transistors 702 and 703 is equal to the product of the currents flowing in transistors 709 and 710. It will be clear therefore that equation 12 can be constructed if the currents flowing in transistors 702, 703, 709 and 710 are as follows:

$$\text{Current flowing in } 702 = Iup \qquad (13)$$

$$\text{Current flowing in } 703 = Ifb \qquad (14)$$

$$\text{Current flowing in } 709 = Io \times \frac{Vosc@ton}{Vm} - Ifb \qquad (15)$$

$$\text{Current flowing in } 710 = Idn \qquad (16)$$

From the schematic of FIG. 7, it is noted that the currents flowing in transistors 702 and 703 are Iup and Ifb respectively. As shown in the example, current source 701 is a separate current source from current source 728 but provides substantial identical current.

In the example, the current flowing in transistor 709 is constructed in the following way to provide the relationship of equation 15. By matching transistors 715 and 716, operating them in their linear region of operation and coupling them through a current mirror formed by transistors 707 and 708, the voltage appearing across transistors 715 and 716 will be equal such that the following relationship is true:

$$\frac{Io}{Vm} = \frac{Ix}{Vosc} \qquad (17)$$

and therefore $$Ix = \frac{Io \times Vosc}{Vm} \qquad (18)$$

Since the specific term of interest in equation 12 uses the oscillator voltage at the time when the switch turns off at the end of the switch on time, Vosc@ton, equation 18 can be rewritten:

$$Ix = \frac{Io \times Vosc@ton}{Vm} \qquad (19)$$

To complete the denominator of equation 12, it only remains to subtract Ifb. In the circuit of FIG. 7, the current flowing in transistor 716 includes Ifb, which is summed at node 756. This Ifb is generated through the current mirror formed by transistors 704 and 705 mirroring the current flowing in transistor 703. From equation 19 therefore, the current flowing in transistor 709 is:

$$\text{Current flowing in transistor } 709 = Io \times \frac{Vosc@ton}{Vm} - Ifb \qquad (20)$$

Through the operation of the multiplier circuit formed by transistors 702, 703, 709 and 710 therefore, the current flowing in transistor 710 is $I_{dn}(t)$. Current $I_{dn}(t)$ 751 is expressed as a function of time since this current will vary with the voltage Vth+Vosc 753. In order to satisfy the relationship of equation 12, however, it is necessary to calculated the value of $I_{dn}(t)$ 751 at the end of the turn on time of switch 726 as will be described below.

As shown in the example, current $I_{dn}(t)$ is reflected through transistors 712 and 713. Transistors 712 and 713 form part of logic circuit 757 that determines the time at which the switch 726 turns off each switching cycle, which depending on the duty cycle control mode of operation, could include the current flowing in switch 726 reaching a threshold value, or the cycle time of switch 726 reaching a threshold value, or the like in accordance with the teachings of the present invention. However the details of this logic are not discussed in further detail since the operation of circuit 750 to provide the relationship of equation 12 is specifically designed in the example to be constant regardless of the reason for the switch 726 to be turned off and thus provide substantially constant gain regardless of the duty cycle control mode of operation according to the teachings of the present invention.

Continuing with the example, $I_{dn}(t)$ 751 is also reflected through transistor 714 and in turn reflected again through the current mirror formed by transistors 719 and 720. However transistor 719, switch 722 and capacitor 721 form a sample and hold circuit. The function of this circuit is to capture and hold the value of $I_{dn}(t)$ at the time when switch 726 is turned off. In order to perform this function, switch 722 is coupled to receive the gate drive signal 758 for switch 726. When gate drive signal 758 goes low, switch 722 is opened and capacitor 721 holds a voltage proportional to the value of $I_{dn}(t)$ at the instant switch 726 was turned off. In this way $I_{dn}$ 752, which is the current flowing in transistor 720 after the switch 722 is opened, is no longer time variant but instead is substantially fixed at the value of current $I_{dn}(t)$ at the instant the switch turns off according to the relationship of equation 12. In this way the discharge current of capacitor 727 is determined based on the relationship of equation 12 independent of the duty cycle control mode of operation in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, the controller comprising:
   an oscillator to be coupled to a switch of the power converter to determine a time at which the switch is turned on at a beginning of a switching cycle of the switch; and
   a logic circuit to be coupled to the switch to determine a time at which the switch is turned off during the switching cycle of the switch, wherein the controller includes first and second duty cycle control modes responsive to a magnitude of a feedback signal to regulate power delivered to an output of the power converter, wherein in response to the magnitude of the feedback signal being below a threshold, the oscillator generates an output signal to fix a time period of the switching cycle of the switch during the first duty cycle control mode and wherein in response to the magnitude of the feedback signal being above the threshold, the oscillator generates the output signal to vary the time period of the switching cycle of the switch during the second duty cycle control mode.

2. The controller of claim 1, wherein the controller is adapted to transition between the first and second duty cycle control modes responsive to a magnitude of current flowing in the switch reaching a current threshold value.

3. The controller of claim 1, wherein the controller maintains a constant magnitude of a peak current flowing in the switch during the second duty cycle control mode.

4. The controller of claim 1, further comprising a feedback terminal to be coupled to receive the feedback signal of the power converter, wherein an on time of the switch is directly proportional to the magnitude of the feedback signal during the first duty cycle control mode.

5. The controller of claim 1, further comprising a feedback terminal to be coupled to receive the feedback signal of the power converter, wherein the oscillator generates the output signal to vary the time period of the switching cycle in response to the magnitude of the feedback signal during the second duty cycle control mode.

6. The controller of claim 5, wherein the oscillator generates the output signal to vary the time period of the switching cycle of the switch during the second duty cycle control mode such that the time period of the switching cycle is proportional to a ratio of an on time of the switch and the magnitude of the feedback signal.

7. The controller of claim 1, wherein the oscillator further comprises:
   a capacitor; and
   a charging current source and a discharging current source coupled to charge and discharge the capacitor, respectively, wherein a time period for the capacitor to charge and discharge between first and second voltage levels is the time period of the switching cycle of the switch.

8. The controller of claim 7, wherein a value of discharge current of the discharging current source is varied while a value of charge current of the charging current source is fixed during the second duty cycle control mode.

9. The controller of claim 8, further comprising a sample and hold circuit coupled to the oscillator and coupled to capture and hold the value of the discharge current at the time at which the switch is turned off, wherein the value of the discharge current is varied in response to the value of the discharge current captured and held by the sample and hold circuit.

10. The controller of claim 9, wherein the switch is a first switch and wherein the logic circuit is coupled to output a gate drive signal to control the first switch, wherein the sample and hold circuit further comprises:
    a capacitor to store a voltage; and
    a sample and hold switch coupled to the capacitor and coupled to receive the gate drive signal to open the sample and hold switch at the time at which the first switch is turned off, wherein the voltage stored in the capacitor at the time at which the first switch is turned off is proportional to the value of the discharge current.

11. The controller of claim 1, wherein controller and the switch form part of an integrated circuit that is manufactured as a hybrid or monolithic integrated circuit.

* * * * *